United States Patent
Snider et al.

[15] 3,656,251
[45] Apr. 18, 1972

[54] FISH CATCH INDICATOR

[72] Inventors: Albert L. Snider, 1601 Corona, Austin, Tex. 78723; Charles V. Jaecks, 612 East Virginia Drive, Round Rock, Tex. 78664

[22] Filed: Nov. 10, 1969

[21] Appl. No.: 875,452

[52] U.S. Cl. ............................................................. 43/17
[51] Int. Cl. ............................................... A01k 97/12, A01k 93/00
[58] Field of Search ............................................. 43/17

[56] References Cited

UNITED STATES PATENTS

| 2,255,959 | 9/1941 | Barber | 43/17 |
| 2,153,750 | 4/1939 | Goertzen | 43/17 |
| 2,133,880 | 10/1938 | Wallace et al. | 43/17 |
| 2,722,763 | 11/1955 | Miner et al. | 43/17 |
| 1,529,949 | 3/1925 | Good | 43/17 |
| 2,425,825 | 8/1947 | Philips | 43/17 |

Primary Examiner—Samuel Koren
Assistant Examiner—Daniel J. Leach
Attorney—Marion E. Shafer

[57] ABSTRACT

An improved electronic fish catch indicator adapted to be connected to fisherman's line comprising a tubular housing for a battery cell, a lamp, and a removable switch assembly. The switch assembly includes an arc-shaped flexible electrode, fixed switch contact surfaces, and a contact electrode movable against spring bias into contact with the fixed surfaces by a pull on a stem secured to the movable electrode to close the electrical circuit. A fishing line with a hook thereon is secured to the end of the stem extending outwardly of the housing and a pull on the line by a fish will actuate the switch to close the circuit and light the lamp. The switch assembly provided with a variable sensitivity control means for the spring biasing the movable electrode.

8 Claims, 9 Drawing Figures

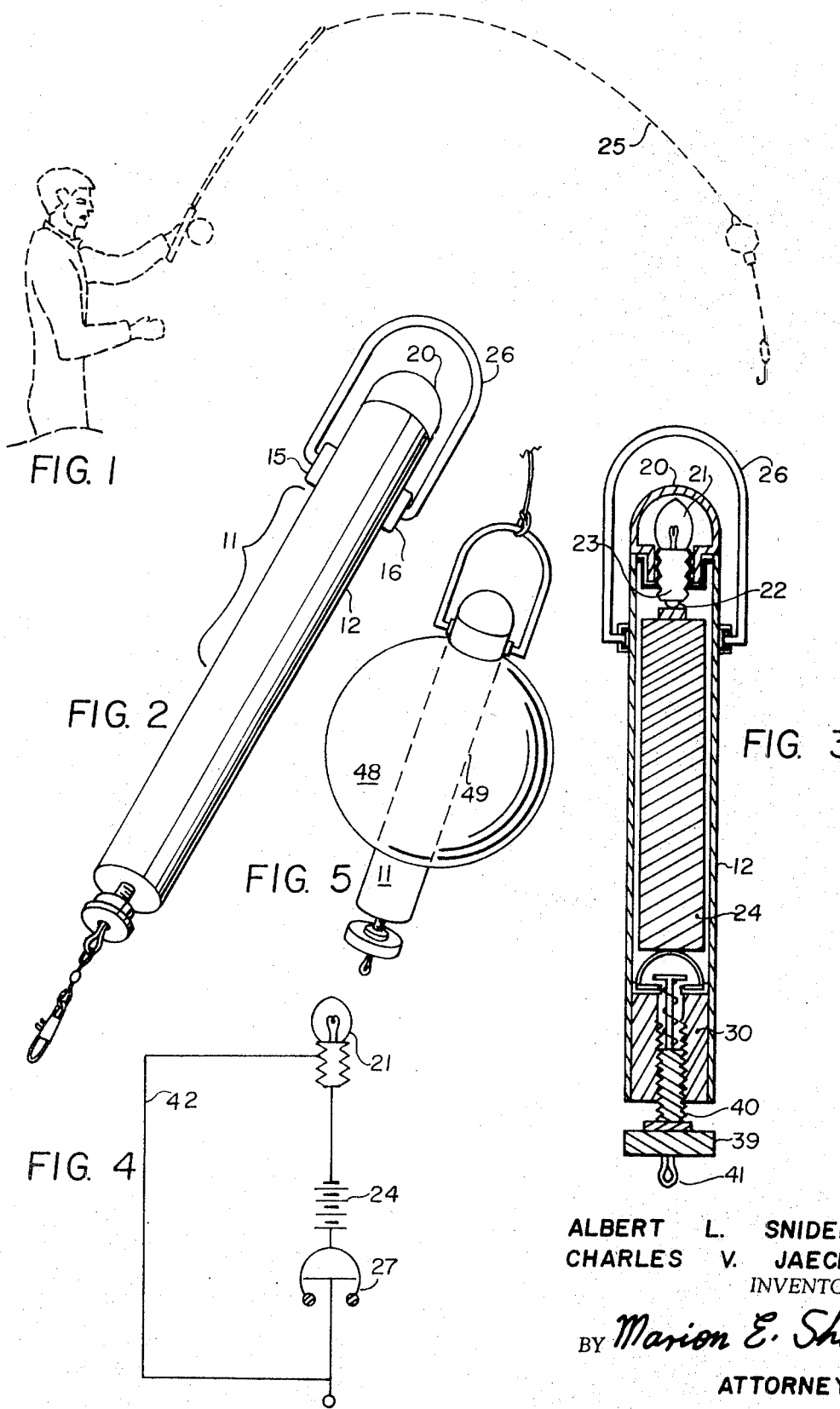

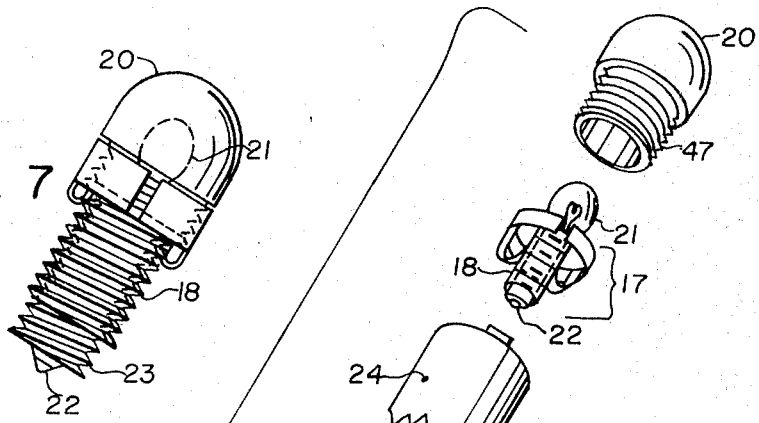
FIG. 7
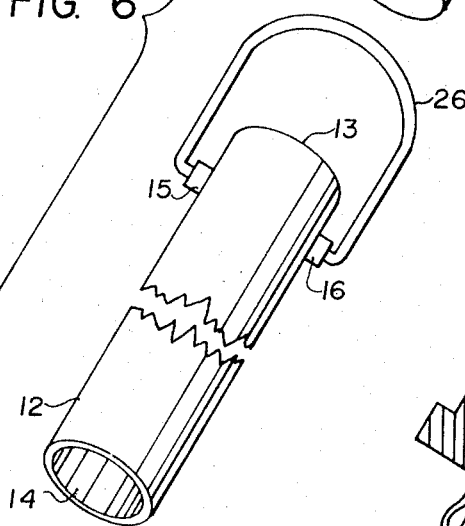
FIG. 6
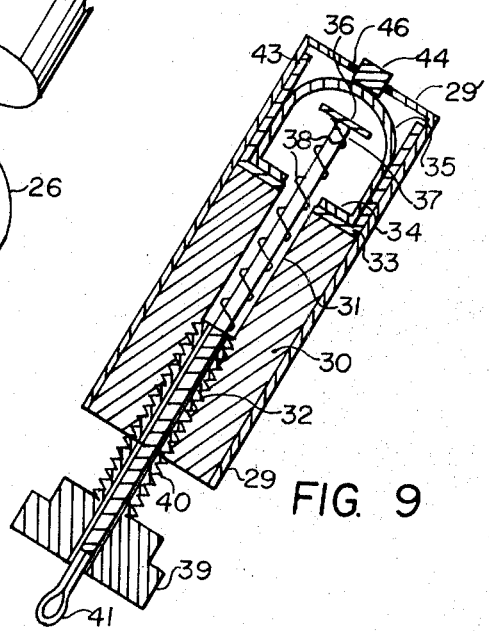
FIG. 9
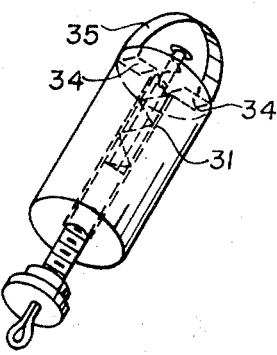
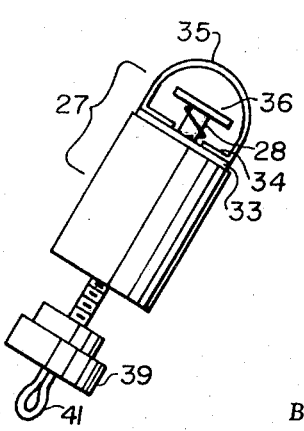
FIG. 8
ALBERT L. SNIDER,
CHARLES V. JAECKS,
INVENTOR.
BY *Marion E. Shafer*
ATTORNEY.

FISH CATCH INDICATOR

SUBJECT MATTER OF INVENTION

This invention relates generally to electronic signal devices and more particularly to improvements in apparatus for providing a visual signal when a fish is caught on a fisherman's line.

PRIOR ART

Where a fisherman tries to tend more than one fishing line or when a fisherman fishes through long hours at night, especially on cold nights when the fisherman's alertness becomes numbed, a signal is frequently needed to call the fisherman's attention to the fact that he has a bite that may require attention. A variety of bells attached to the fishing line and other audible signaling instruments have been devised but audible signals are likely to frighten away other fish in the area and this may be disconcerting to other fishermen if several fishermen are attempting to fish in the same general area.

A flashing electric light is undoubtedly the quietest and best fish catch signal indicator devised so far but the several attempts to provide electric fish catch indicators so far have tended to be sufficiently complex in structure and delicate in maintenance and operation as to discourage fishermen from attempting to purchase and maintain such expensive and delicate devices. The fisherman needs something that is sufficiently sturdy, simple and straight forward that he can with confidence make on the spot repairs and adjustments for himself when necessary.

OBJECTS OF THE INVENTION

An object of the present invention is to provide an inline electronic fish catch indicator that can be connected directly into the fisherman's line in the same manner as a float is tied into the line and will therefore require no special mounting apparatus on the fishing pole. Devices which must be mounted on or attached to the fishing pole are mear nuisances in the daytime and are often inconvenient to remove. The device contemplated in this invention need not be attached to the fishing pole or any of the fisherman's permanent equipment and can be quickly eliminated simply by cutting it out of the line.

Another object of the invention is to provide a visual electronic fish catch indicator that is completely self contained and sufficiently small and compact that it can be stored in the fisherman's tackle box without consuming much more space than would ordinarily be occupied by a regular fishing float.

Another object of the invention is to provide a new and improved electronic visual fish catch indicator that is so near analogous to a standard flashlight and of such simple straight forward construction that the ordinary fisherman will be able to make minor repairs and replace defective or worn out parts on the spot.

A still further object of the invention is to make all parts of the device that can ordinarily break down or wear out completely interchangeable and replaceable in the same sense that flashlight bulbs and flashlight batteries are now interchangeable replaceable parts.

Whereas moisture will inevitably collect in any kind of fishing apparatus and moisture produces corrosion in electronic switches, it is therefore an object of this invention to devise a means of sealing the electric switch in a special replaceable sealed unit so that reverse replacement switches can be purchased in advance and stored for future contingent use in the same manner that the prudent user will maintain a small reserve stock of flashlight bulbs and flashlight batteries for replacement purposes.

Since any electrical switch which must be pulled upward or which must be actuated by some form of lateral pressure will vary in sensitivity with the position of the fishing pole or with the direction from which the fishing line is pulled, it is an object of this invention to minimize these sources of inaccuracy in the fish catch indicator described herein by employing an indicator device that is connected in axial alignment with the fishing line and provided with a switch mechanism which is closed or turned on by a direct pull of said fishing line.

A further object of the invention is to provide a means by which the fisherman may manually adjust the sensitivity of the electrical switch on said visual fish catch indicator and to incorporate the working parts of such adjustment mechanism inside of the sealed switch unit.

Other objects and advantages of this invention will become apparent through consideration of the following description and appended claims in conjunction with the attached drawings in which:

DESCRIPTION OF THE SEVERAL VIEWS IN THE DRAWINGS

FIG. 1 is a perspective view of a fisherman casting with a line equipped with a visual signal indicator of the character described herein;

FIG. 2 is a perspective view of the exterior appearance of the improved electric signal fish catch indicator that constitutes this invention;

FIG. 3 is a cross section view of the device shown in FIG. 2 providing sectional illustrations and arrangement of the interior parts of said improved electric signal fish catch indicator;

FIG. 4 is a simplified circuit diagram of the electrical portions of the invention;

FIG. 5 is an illustration of the fish catch indicator mounted in a special float;

FIG. 6 is an exploded partial perspective view of the several parts that make up the basic version of said electric fish catch indicator;

FIG. 7 is an illustration of a waterproof unitary signal lamp and dome protective cover structure assembled as a single prefabricated unit;

FIG. 8 is an exterior view of the inline electric switch;

FIG. 9 is a cross section view of an alternate version of the inline electric switch fabricated within a water-proof tubular structure.

In describing one selected form or preferred embodiment of this invention as shown in the drawings and described in this specification, specific terms, and components are used for clarity. However, it is not intended to limit the claimed invention to the specific form, components or construction shown and it is to be understood that the specific terms used in this illustration of the invention are intended to include all technical equipments which operate in a similar manner to accomplish a similar purpose.

DETAILED DESCRIPTION OF PREFERRED EMBODIMENT OF INVENTION

Referring to the specific embodiment of the invention selected for illustration in the accompanying drawings, number 11 refers to the improved electric signal fish catch indicator as a whole as is illustrated in FIG. 2 of the drawings herein. The device is in the nature of a special purpose flashlight with modifications and additions to permit it to be employed as an electric signal fish catch indicator when inserted in series with a fisherman's fishing line as illustrated in FIG. 1. The device is housed in a tubular housing structure 12 which is of such length as to accommodate one or more flashlight cells with appropriate openings 13 and 14 at the upper and lower end of said housing structure. At an intermediate point near the upper end of said tubular housing structure 12 there is provided a pair of mounting shoulders 15 and 16 for pivotally mounting an appropriate bail 26 or equivalent means of suspension support.

Signal bulb mounting assembly 17 may be fabricated in a variety of ways to engage or friction fit into openings 13 at the upper end of housing structure 12. Said signal bulb mounting assembly 17 is provided with appropriate hardware or electrical socket 18 adapted for receiving and mounting an electric signal bulb 21 with said signal bulb mounting assembly being further provided with an appropriate support shoulder to engage within the interior opening of dome-shaped protective cover structure 20. Said dome-shaped protective cover structure 20 should be fabricated from a transparent plastic material and should be adapted to engage with or into opening 13 at the upper end of the tubular housing structure. In the version illustrated in the exploded view in FIG. 6, signal bulb mounting assembly 17 is fabricated in such manner as to friction fit within the inside surface of dome-shaped protective cover structure 20 which in turn is provided with a shank or neck area into which have been cut mounting threads 47 adapted to engage with mating mounting threads (not shown) inside the upper opening 13 of tubular housing structure 12. Some difficulty is encountered in securing threads in plastic material that will provide watertight engagement with threads inside tubular housing structure 12. It may therefore be preferable to fabricate signal bulb mounting assembly 17 and dome-shaped protective structure 20 is such a manner as to permit them to friction fit into opening 13 in tubular housing structure 12. The matter of providing a mounting assembly for the signal bulb and the dome-shaped protective cover structure with a waterproof seal connection to or into upper opening 13 of housing structure 12 can be accomplished in a variety of ways by any competent artisan once the problem and requirements are pointed out. However, it should be kept in mind that the combination of signal bulb mounting assembly 17 and dome-shaped protective cover structure 20 need to be fabricated in such forms that the combined structure can be inserted into and removed from opening 13 in housing structure 12 when it is necessary to replace a burned out or defective signal lamp bulb.

Electric signal bulb 21 may be any appropriate commercial flashlight lamp bulb or signal lamp bulb selected to operate upon the potential provided by the number of battery cells employed in the device. The first or positive electrode 22 on the base of signal bulb 21 should normally project into the interior of the tubular housing structure 12 to contact or engage the positive terminal of battery cell 24 while the second electrode 23 will normally engage and contact the middle portions of electric socket 18 and signal bulb mounting assembly 17 as provided in conventional electrical hardware. If the device must be fabricated within limits of size and weight required to be compatible with comfortable and efficient casting in accordance with conventional rod and reel casting technique, then housing structure 12 will probably be restricted to approximately the size of a large fountain pen and the device should be designed to operate with a 1½-volt flashlight lamp bulb 21 and a single penlight flashlight cell 24 for electrical power. It should also be realized that tubular housing structure 12 will have to exceed the length of a standard penlight cell by a sufficient amount to permit insertion and mounting of signal bulb 21 and signal bulb mounting assembly 17 in the upper end of tubular housing structure 12 and sufficient length to permit the insertion and mounting of an electric switch assembly inside the lower end of said housing structure 12.

The upper end of improved electric signal fish catch indicator 11 is tied to fishing line 25 by means of a pivoted bail 26 or an equivalent suspension support means which is connected to mounting shoulders 15 and 16.

A replaceable electric switch assembly 27 is designed to have such proportions and structure as to friction fit into lower opening 14 in tubular housing structure 12. It will be readily apparent that said switch assembly should fit into opening 14 in tubular housing structure 12 with sufficient precision to provide a watertight seal or as near a watertight seal as possible since the continued presence of water inside the structure for any length of time will prejudice the life and operation of both the battery cell 24 and the electrical parts of switch assembly 27. The several parts of said switch assembly 27 are mounted or assembled on or in switch assembly core 30. Switch assembly core 30 is provided with a longitudinal tubular opening 31 through the central axis of said core 30 with a substantial portion of the lower part of said tubular opening 31 being provided with an interior threaded surface 32. On the upper or interior end of switch assembly core 30 there is mounted an insulating washer 33 which in turn provides support to the parts of fixed switch electrode contact surfaces 34 — 34. These contact electrodes 34 — 34 in turn connect to a flexible electrode 35 adapted to provide resilient electrical contact with the negative end of battery cell 24. The flexible electrode 35 is formed from an arc of metal spring material extending upward from fixed contact surfaces 34 — 34. Fixed switch contact points 34 — 34 are insulated from the core of the switch assembly and from tubular housing structure 12 by means of insulating washer 33. Moveable contact electrode 36 is mounted on stem 37 which extends through tubular opening 31 in core 30. The head or contact portion of electrode 36 is mounted on the end of stem 37 at right angles thereto so that a downward pull on stem 37 will force said electrode 36 into electrical contact with surfaces 34 — 34. The electrode 36 is maintained in normally open or nonconductive position by means of a spring-biasing means 38. Spring 38 must be of sufficiently small diameter to fit inside opening 31 in core 30 and stem 37 extends through the interior of said spring with the upper end of said spring 38 pressing against the lower surface of switch electrode 36. Manual means 39 for adjustment of switch sensitivity is provided by an adjustment knob with attached adjustment shank 40 which is provided with threads on the exterior surface thereof which will mate and screw into threads 32 in the interior opening 31 through core 30. Since the lower end of spring 38 rests against the upper shoulder of shank 40 the amount of compression force exerted by spring 38 may be varied by adjusting the position of said manual means 39 and adjustable shank 40 with its threaded surface. Moveable switch stem 37 also extends through a tubular opening through central axis of shank 40 and manual means 39 to terminate in a hook or fish line connecting means 41. The switch is actuated or closed by a downward pull on said fish line connecting means 41.

In previous electrically-operated fish catch indicators the structure of the switch mechanism has usually been such that a pull on the fish line in some directions would exercise greater pull on the switch than would be caused by a fish line pull from other directions which impared the reliability of the device. It should be noted that if an electric fish catch indicator device of the character described herein is tied in series with the fishing line, that when a fish strikes the hook from any direction the resulting pull on the line will align the fish catch indicator device 11 with the remainder of the fishing line so that the lower portion of said fishing line pulls directly downward on hook 41, moving switch contact 36 into electrical contact with fixed contact surfaces 34 — 34. This closes the circuit and causes signal lamp bulb 21 to light up producing a visual signal to the fisherman that he has a strike or bite.

As illustrated in FIG. 4 of the drawings herein, fish catch indicator 11 is composed of signal lamp bulb 21 wired in series with a battery cell 24, and in-line electric pull-switch 27 together with an electrical connective return means 42 which connects the movable part of switch assembly 27 to the second electrode 23 on signal light bulb 21. In the foregoing description the function of electrical connective return means 42 is performed by the metal surfaces of tubular housing structure 12. It should be readily apparent, however, that if tubular housing structure 12 or most of the device is fabricated from plastic or other nonconductive material that a separate electrical return means 42 will have to be employed to connect switch assembly 27 to the second electrode of signal lamp 21.

Since the signal device described herein operates on a very low electrical voltage potential, small quantities of moisture and water leaking into the interior of tubular housing structure 12 will not immediately prevent the device from operating but it should also be readily apparent that the continued presence of either water of moisture inside said device will accelerate break down of the battery cell, corrode and damage the moving and contacting parts of switch assembly 27 and will generally contribute to corrosion of all of the metal parts inside said fish catch indicator device. Obviously, the device must be able to be opened at either one or both ends in order to provide for periodic replacement of battery cell 24 and occasionally for replacement of electric signal lamp 21 when said lamp burns out.

If the tubular housing structure 12 cannot be permanently sealed because of the necessity of periodically replacing worn out battery cells and burned out electric signal lamps, and if without such sealing it is virtually inevitable that moisture and eventually water will get into the fish catch signal device, two of the moisture-vulnerable parts of the mechanism may be fabricated within waterproofed sealed units designed and adapted to be replaceable modules to be inserted into the indicator device and replaced as needed. That is, the mounting assembly 17, lamp 21, and cover 20 may be manufactured as a single integrated waterproofed unit. Also, a replaceable switch assembly may be completely encased in a sealed waterproof capsule or module.

In fabricating a switch assembly 27 as illustrated in FIG. 8 into an integrated waterproof module most of the basic features of the switch structure and mechanism described above will be retained and only modest additions will be necessary. In the first instance, tubular switch assembly case 29 is extended upward as shown in FIG. 8 and a top cover 29' is provided, which may be a separate structure or cast as an integral part of switch case 29. In order for the device to function as a switch, flexible electrode 35 must be prevented from coming into electrical contact with the metal walls of assembly case 29. In FIG. 9, insulating washer 33 is shown as extending upward between flexible electrode 35 and the metal walls of assembly case 29 and designated by the number 43. Electrical connection between electrode 35 and the negative end of battery cell 24 is secured by means of connective electrode 44 welded to the top of flexible electrode 35 with the other end of electrode 44 projecting through an opening in the top of switch assembly case 29. Since electrode 44 must be allowed to move back and forth by a small fraction of an inch in order to secure firm electrical contact with the negative end of battery cell 24, a waterproof bushing 46 is provided to seal the opening in the top of switch assembly case 29 through which connective electrode 44 passes. With the operating switch portions of switch assembly 27 enclosed and sealed or waterproofed as shown in FIG. 9 moisture or water will be precluded from reaching electrical contact surfaces of said switch. Under the circumstances, the sealed switch unit will be protected against moisture and corrosion and will remain serviceable through a period at least several times as long as the simple switch assembly shown in FIG. 8.

The signal device may also be employed with a pole-supported fishing line, provided the pole is set into a fixed support in such an angle or position as to hold the fish catch indicator 11 above the water level to preclude submergence of the indicator 11. In order to permit the fisherman to use the device as a bobber, a removable sphere of flotation material 48 which should be of sufficient size to support or float the amount of weight involved may be attached to indicator 11 by means of a longitudinal tubular opening 49 through the center of sphere 48. In this manner, the float is adapted to support the indicator 11 in a vertical position such that signal lamp 21 at the upper end of said device is supported in a visible position above the water level at all times.

OPERATION

The assembled fish catch indicator 11 is tied in series with fishing line 25 at a point preferably above the water level so that any pulling motion by a fish seizing the hook on said line will produce a downward pull on fish line connecting means 41 and switch stem 37 so that moveable switch contact electrode 36 will be driven into contact with fixed switch electrode contact surfaces 34 — 34 closing the electrical circuit whereby current may flow from battery cell 24, through closed switch assembly 27, through the metal walls of tubular housing 12 or electrical connective means 42 to the second electrode on signal lamp bulb 21, through said signal lamp bulb 21 to the positive or first electrode on the base of said lamp bulb 21 and then back to battery cell 24 which will cause illumination of signal lamp 21 to attract the attention of the fisherman.

If the tension provided by spring biasing means 38 is inadequate the device will be plagued by flickering false alarms by ripples in the water and minor movements in stream current. On the other hand, excessive pressure provided by spring-biasing means 38 may prevent the device from responding to the bite and pull of a small fish. By manually rotating the thumb knob 39 to move threaded shank 40, the fisherman can adjust the sensitivity of electric switch assembly 27 to respond to the desired amount of pull on said fishing line.

In instances in which the fisherman is apt to use fish catch indicator 11 in conjunction with a fishing pole and line the tubular housing structure 12 of fish catch indicator 11 may be inserted through tubular opening 49 within sphere 48 to create a combination float or bobber and fish catch indicator and then connect this combination device with fishing line 25 as illustrated in FIGS. 1 and 5. Said sphere 48 will support indicator 11 in the water in an upright position so that signal lamp bulb 21 will float above the water level permitting signals to be readily visible to the fisherman. Except for improved visibility of signal lamp 21 in night time fishing, the other aspects of using combined indicator 11 and sphere 48 will be much the same as fishing with an ordinary bobber float in the day time.

ADVANTAGES

In the foregoing description of the structure and operation of the invention set forth herein a number of advantages have been claimed for the apparatus and others will be readily apparent to persons skilled in the art. The major object of the invention is to provide an electronic fish catch indicator that can be connected directly into the fisherman's line in much the same manner as a float is tied into the line, thereby eliminating the need for any special mounting apparatus. In addition, by employing a special "in-line pull switch," that is, in alignment with the fishing line no matter which direction the line is pulled from, an indicator device has been provided with a more sensitive and reliable switch.

A further advantage of the invention is that it provides a visual electronic fish indicator that is completely self-contained and that is sufficiently compact that it can be stored in the fisherman's tackle box without consuming much more space than would ordinarily be occupied by a regular fishing float.

Another advantage of the invention is that it provides a new and improved electronic visual fish catch indicator that is so near analogous to a standard flashlight and is of such simple straightforward construction that an ordinary fisherman will be able to make minor repairs and replace defective or worn out parts on the spot.

A still further advantage of the invention is that all of the parts of the device that can ordinarily break down or wear out may be readily manufactured in completely interchangeable and replaceable parts or modules in the same sense that flashlight bulbs and flashlight batteries are now interchangeable replaceable parts.

Still a further advantage of this invention is that it provides an improved electronic visual fish catch indicator of the character described in which the problems precipitated by the inevitable presence of moisture in fishing gear may be minimized by sealing the more vulnerable parts of the electric switch assembly in a special replaceable sealed unit so that reverse replacement switches can be purchased in advance and stored for future contingent use in the same manner that a prudent user would maintain a small reverse stock of flashlight bulbs and flashlight batteries for replacement purposes. Such replaceable sealed units and replaceable sealed unit switches could be expected to provide a much longer period of trouble-free service before needing replacement.

Although this specification describes but a single embodiment of the invention with certain applications thereof, it should be understood that structural or material rearrangements of adequate or equivalent parts, substitutions of equivalent functional elements and other modifications in structure can be made and other applications devised without departing from the spirit and scope of our invention. We therefore desire that the description and drawings herein be regarded as only an illustration of our invention and that the invention be regarded as limited only as set forth in the following claims.

Having thus described my Invention, I claim:

1. An improved in-line electric signal fish catch indicator, comprising:
   A. a tubular housing structure of appropriate length to house at least one flashlight cell and associated lamp and switch, and having
      1. openings at each end of said housing structure,
      2. mounting shoulders for attaching a suspension bail or equivalent suspension supporting means;
   B. a signal bulb mounting assembly, said assembly having
      1. means for receiving and mounting a replaceable signal bulb,
      2. a dome shaped protective cover structure adapted to cover and protect the signal bulb and to cover the exterior portion of the signal bulb mounting assembly, and
      3. means for insertable - removable mounting of said signal bulb mounting assembly in the opening at the upper end of the tubular housing structure;
   C. a replaceable electrical signal bulb mounted in said signal bulb mounting assembly with the base terminal of said signal bulb projecting into the interior of the tubular housing structure to make contact with the positive terminal of a battery cell;
   D. at least one battery cell insertably - removably mounted within said tubular housing positioned to make contact with the base of said signal bulb;
   E. a bail or equivalent suspension support means pivotally attached to the mounting shoulders provided on the exterior of said tubular housing structure;
   F. an insertable removable electric switch assembly adapted to insert into and close the lower opening in the tubular housing structure, said electric switch assembly having,
      1. an arc shaped flexible electrode mounted in the upper part of said switch assembly where it can make contact with the negative end of the battery cell but otherwise insulated from the metal walls of the tubular housing structure,
      2. fixed switch electrode contact surfaces connected to said flexible electrode,
      3. a pull switch movable contact electrode attached to a pull stem concentrically and longitudinally mounted within the body of the switch assembly such that the movable contact electrodes are closed by application of in - line pulling action on the stem of said switch contactor;
      4. fish line connecting means attached to the lower end of the stem of the switch contactor;
   G. electrical connective means from the outside body terminal portion of said switch assembly to the second electrode on the signal light bulb to complete an operative electrical circuit when the pull switch is actuated.

2. The improved in-line electric signal fish catch indicator described in claim 1 together with manual means for adjustment of the switch sensitivity to variations in the amount of pulling force applied to said switch.

3. The improved in-line electric signal fish catch indicator described in claim 1 in which the electric signal bulb, the electric signal bulb mounting assembly and the dome shaped protective cover structure are combined into a water-proofed unitary replaceable sealed-unit insertable-removable structure adapted to fit into the opening in the upper end of the tubular housing structure for said device.

4. The improved in-line electric signal fish catch indicator described in claim 1 with an attachable - removable flotation means to support said electric fish catch indicator when the device is used in water.

5. An improved in-line electric signal fish catch indicator, comprising;
   A. a tubular housing structure of appropriate length to house at least one flashlight cell and associated lamp and switch, and having
      1. openings at each end of said housing structure,
      2. mounting shoulders for attaching a suspension bail or equivalent suspension supporting means;
   B. a signal bulb mounting assembly, said assembly having
      1. means for receiving and mounting a replaceable signal bulb,
      2. a dome shaped protective cover structure adapted to cover and protect the signal bulb and to cover the exterior portion of the signal bulb mounting assembly, and
      3. means for insertable-removable mounting of said signal bulb mounting assembly in the opening at the upper end of the tubular housing structure;
   C. a replaceable electric signal bulb mounted in said signal bulb mounting assembly with the base terminal of said signal bulb projecting into the interior of the tubular housing structure to make contact with the positive terminal of a battery cell;
   D. at least one battery cell insertably-removably mounted within said tubular housing positioned to make contact with the base of said signal bulb;
   E. a bail or equivalent suspension support means pivotally attached to the mounting shoulders provided on the exterior of said tubular housing structure;
   F. a replaceable insertable-removable sealed-unit electric switch assembly adapted to insert into and close the lower opening in the tubular housing structure, said electrical switch assembly having
      1. a cylinder shaped waterproof housing structure for said switch assembly,
      2. a flexible mounted electrode projecting through a sealed opening in the upper surface of the switch housing to make resilient contact with the negative end of the battery cell,
      3. fixed switch electrode contact surfaces mounted in the upper part of the switch assembly with electrical connective means to said flexibly mounted electrode but otherwise insulated from the metal walls of the tubular housing structure,
      4. a pull switch movable contact electrode attached to a pull stem concentrically and longitudinally mounted within the body of the switch assembly such that the movable contact electrodes are closed by application of in-line pulling action on the stem of said movable switch contactor electrode;
      5. fish line connecting means attached to the lower end of the stem of the switch contactor; and
   G. electrical connective means from the outside body terminal portion of said switch assembly to the second electrode on the signal light bulb to complete an operative electrical circuit when the pull switch is actuated.

6. The improved in-line electric signal fish catch indicator described in claim 5 together with manual means for adjustment of the switch sensitivity to variations in the amount of pulling force applied to said switch.

7. The improved in-line electric signal fish catch indicator described in claim 5 in which the electric signal lamp bulb, the electric signal bulb mounting assembly and the dome shaped protective cover structure are combined into a waterproofed unitary replaceable insertable-removable sealed-unit structure adapted to fit into the upper end of the tubular housing structure for said device.

8. An improved in-line electric signal fish catch indicator, comprising:
  A. a tubular housing structure of appropriate length to house at least one flashlight cell and associated lamp and switch, and having
    1. openings at each end of said housing structure,
    2. mounting shoulders for attaching a suspension bail or equivalent suspension supporting means;
  B. a replaceable insertable-removable sealed-unit including an electric signal lamp bulb, a signal bulb mounting device and a dome shaped protective cover structure combined into a unitary structure adapted to fit into and close the opening in the upper end of the tubular housing structure for said device;
  C. at least one battery cell insertably-removably mounted within said tubular housing positioned to make contact with the base of said signal bulb;
  D. a bail or equivalent suspension support means pivotally attached to the mounting shoulders provided on the exterior of said tubular housing structure;
  E. a replaceable insertable-removable sealed-unit electric switch assembly adapted to insert into and close the lower opening in the tubular housing structure, said electrical switch assembly having
    1. a cylinder shaped waterproof housing structure for said switch assembly,
    2. a flexible mounted electrode projecting through a sealed opening in the upper surface of the switch housing to make resilient contact with the negative end of the battery cell,
    3. fixed switch electrode contact surfaces mounted in the upper part of the switch assembly with electrical connective means to said flexibly mounted electrode but otherwise insulated from the metal walls of the tubular housing structure,
    4. a pull switch movable contact electrode attached to a pull stem concentrically and longitudinally mounted within the body of the switch assembly such that the movable contact electrodes are closed by application of in-line pulling action on the stem of said switch contactor;
    5. fish line connecting means attached to the lower end of the stem of the switch contactor;
  F. electrical connective means from the outside body terminal portion of said switch assembly to the second electrode on the signal light bulb to complete an operative electrical circuit when the pull switch is actuated;
  G. manual means for adjustment of switch sensitivity to the variations in the amount of pulling force applied to said switch; and
  H. an attachable removable float structure adapted to provide flotation means for said electric signal fish catch indicator device when said device is used in the water with said flotation structure being provided with
    1. a spherical shaped external surface,
    2. a longitudinal tubular opening through the center of said sphere of flotation material with said tubular opening being of sufficient size to pass the tubular housing structure of the fish indicator device through the tubular opening in said float structure;

* * * * *